(12) United States Patent
Woo et al.

(10) Patent No.: US 8,834,180 B2
(45) Date of Patent: Sep. 16, 2014

(54) SECONDARY BATTERY

(71) Applicant: Samsung SDI Co., Ltd., Yongin-si (KR)

(72) Inventors: Seok-Gyun Woo, Yongin-si (KR); Sumihito Ishida, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/709,953

(22) Filed: Dec. 10, 2012

(65) Prior Publication Data

US 2013/0236749 A1    Sep. 12, 2013

(30) Foreign Application Priority Data

Mar. 8, 2012   (KR) .................. 10-2012-0023883

(51) Int. Cl.
*H01M 2/12* (2006.01)
*H01M 2/34* (2006.01)

(52) U.S. Cl.
CPC   *H01M 2/12* (2013.01); *H01M 2/34* (2013.01); *H01M 2/345* (2013.01); *Y02E 60/12* (2013.01)
USPC ............................................ 439/56; 429/163

(58) Field of Classification Search
CPC .......... H01M 2/02; H01M 2/12; H01M 2/34; H01M 2/345; H01M 2/1235; H01M 2/1241; H01M 10/52; Y02E 60/12; Y02E 60/122; Y02E 60/124
USPC ............................................ 429/56, 57, 163
See application file for complete search history.

(56) References Cited

U.S. PATENT DOCUMENTS

| 7,041,412 | B2 | 5/2006 | Ishida et al. |
| 7,077,877 | B2* | 7/2006 | Ishida et al. ................ 29/623.5 |
| 8,460,808 | B2* | 6/2013 | Toia et al. ........................ 429/57 |
| 2003/0049519 | A1* | 3/2003 | Ishida et al. ..................... 429/57 |
| 2005/0155217 | A1* | 7/2005 | Ishida et al. ................. 29/623.5 |
| 2006/0168800 | A1* | 8/2006 | Ishida et al. ................. 29/623.1 |
| 2010/0173192 | A1* | 7/2010 | Toia et al. ..................... 429/164 |
| 2010/0255359 | A1 | 10/2010 | Hirakawa et al. |

FOREIGN PATENT DOCUMENTS

| JP | 2010-113888 | 5/2010 |
| KR | 10-0416099 | 1/2004 |
| KR | 10-2008-0036261 | 4/2008 |
| KR | 10-2010-0118394 | 11/2010 |
| KR | 10-2011-0082975 | 7/2011 |
| KR | 10-2011-0103079 | 9/2011 |

* cited by examiner

*Primary Examiner* — Stewart Fraser
(74) *Attorney, Agent, or Firm* — Robert E. Bushnell, Esq.

(57) ABSTRACT

A secondary battery includes an electrode assembly, a gas collecting member and a battery case. The electrode assembly has first and second electrode plates and a separator interposed between the first and second electrode plates. The gas collecting member is provided adjacent to the electrode assembly. The battery case accommodates the electrode assembly and the gas collecting member. In the secondary battery, the gas collecting member has a first collecting member collecting gas generated in the interior of the battery case and a second collecting member provided to surround the first collecting member.

8 Claims, 4 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 8 Mar. 2012 and there duly assigned Serial No. 10-2012-0023883.

BACKGROUND OF THE INVENTION

1. Field of the Invention

An embodiment of the present invention relates to a secondary battery, and more particularly, to a secondary battery having a new member preventing an increase in the internal pressure of the secondary battery, thereby improving reliability characteristics including lifetime, etc.

2. Description of the Related Art

Recently, secondary batteries have been used as power sources of portable electronic devices in many fields, and accordingly, demands on secondary batteries rapidly increase. The secondary batteries may be charged and discharged several times and thus are economically and environmentally effective. Accordingly, the use of the secondary batteries is promoted.

Meanwhile, a secondary battery may be charged/discharged by an electrochemical reaction of a positive electrode plate, a negative electrode plate and an electrolyte in the interior of the secondary battery. When the charging/discharging of the secondary battery is performed, a side reaction occurs together with the electrochemical reaction. This side reaction results in deterioration of the secondary battery; therefore, the lifetime of the secondary battery is decreased. In addition, the side reaction causes gas to be generated in the interior of the secondary battery. The gas causes the secondary battery to be swollen by the increased internal pressure of the secondary battery, and causes the secondary battery to be exploded in a serious case. Accordingly, various studies have been conducted to eliminate gas generated in the interior of a secondary battery.

SUMMARY OF THE INVENTION

Embodiments of the present invention provide a secondary battery having a new member, thereby preventing an increase in the internal pressure of the secondary battery.

Embodiments of the present invention also provide a secondary battery having improved battery characteristic and reliability.

In accordance with an aspect of the present invention, a secondary battery may include an electrode assembly having first and second electrode plates and a separator interposed between the first and second electrode plates; a gas collecting member provided adjacent to the electrode assembly; and a battery case accommodating the electrode assembly and the gas collecting member. The gas collecting member may have a first collecting member collecting gas generated in the inside of the battery case and a second collecting member provided to surround the first collecting member.

The electrode assembly may have first and second electrode tabs respectively connected to the first and second electrode plates, and the first and second electrode tabs may be extracted in parallel from the electrode assembly while being spaced apart from each other.

The gas collecting member may be provided between the first and second electrode tabs.

The first collecting member may include at least one of a porous metal oxide, a porous carbon material and a non-crystalline inorganic oxide.

The porous metal oxide may include at least one of zeolite, silica gel, alumina and molecular sieves.

The porous carbon material may include at least one of carbon molecular sieves and active carbon.

The non-crystalline inorganic oxide may include $Al_2O_3$—$SiO_2$—$TiO_2$.

The second collecting member may include a membrane through which only a gas-phase material passes.

The second collecting member may include a Teflon membrane or hydrophobic polymer membrane.

The secondary battery may further include a valve provided adjacent to the gas collecting member at the exterior of the secondary battery.

The valve may be operated by the internal pressure of the secondary battery, and have an anti-countercurrent valve that enables only the exhaustion of gas and prevents the inflow of gas.

The secondary battery may further include a sealed space portion. The space portion may be provided to be connected to the valve at the exterior of the secondary battery.

As described above, according to the present invention, it is possible to provide a secondary battery having a new member, thereby preventing an increase in the internal pressure of the secondary battery.

Further, it is possible to provide a secondary battery having improved battery characteristic and reliability.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
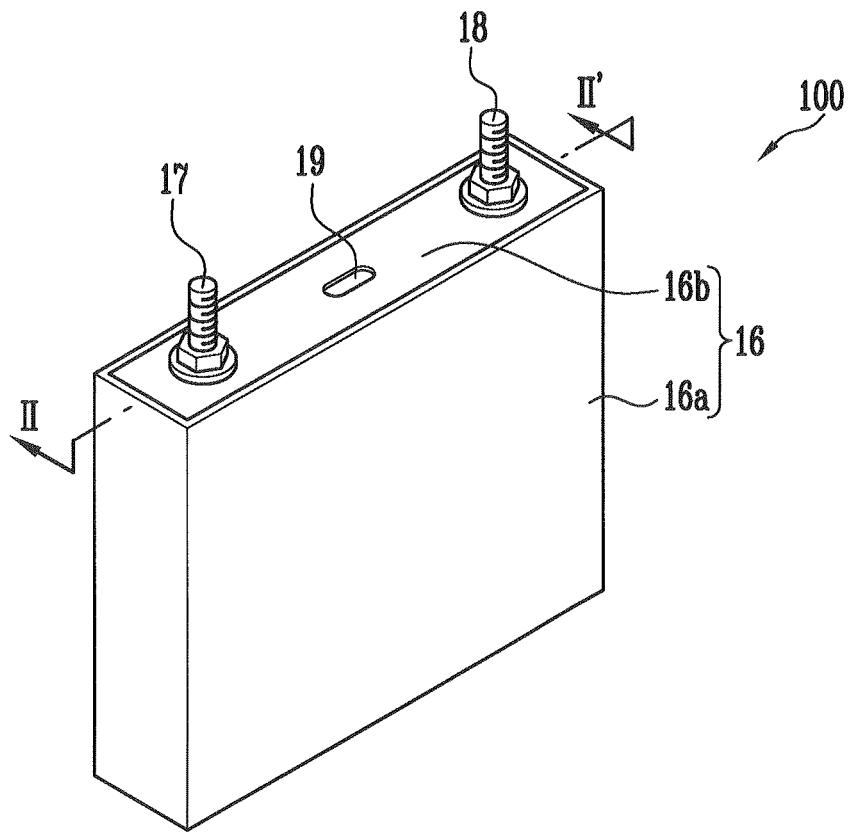
FIG. 1 is an oblique view of a secondary battery constructed with an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, an exemplary embodiment of the present invention will be described in detail with reference to the accompanying drawings.

Figure 2:
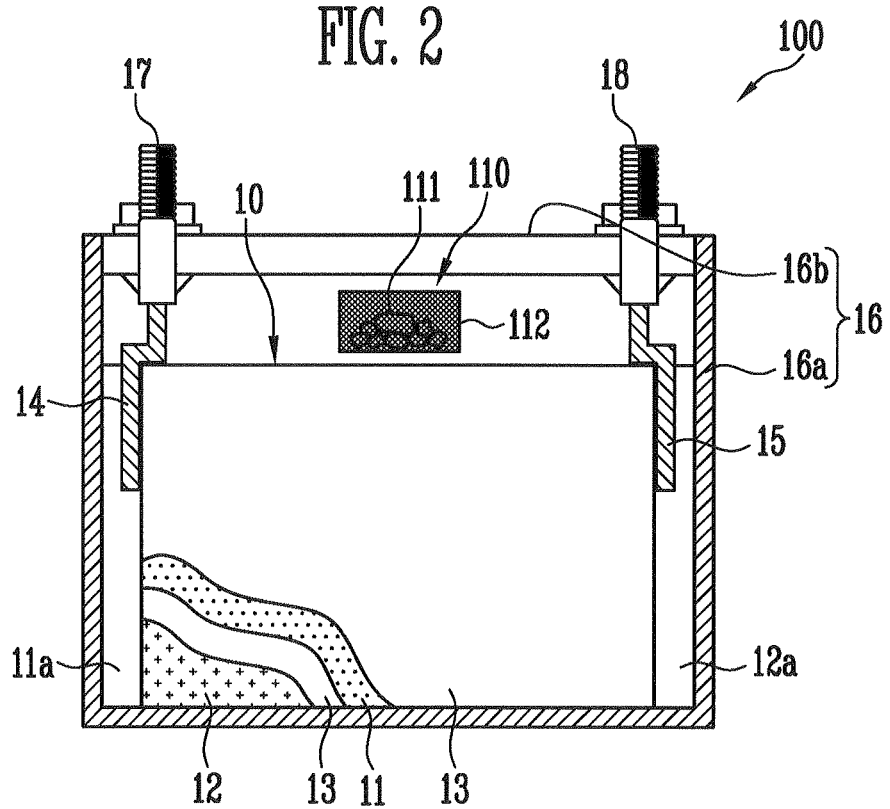
FIG. 2 is a sectional view taken along line II-II' of the secondary battery shown in FIG. 1.

FIG. 1 is a perspective view of a secondary battery constructed with an embodiment of the present invention. FIG. 2 is a sectional view taken along line II-II' of the secondary battery shown in FIG. 1.

The secondary battery 100 constructed with this embodiment includes an electrode assembly 10 composed of first and second electrode plates 11 and 12 and a separator 13 interposed between the first and second electrode plates 11 and 12; a gas collecting member 110 provided adjacent to the electrode assembly 10; and a battery case 16 accommodating the electrode assembly 10 and the gas collecting member 110. The gas collecting member 110 may be composed of a first collecting member 111 collecting gas generated in the interior of the battery case 16 and a second collecting member 112 provided to surround the first collecting member 111.

The electrode assembly 10 may be manufactured by winding or stacking the first and second electrode plates 11 and 12 and the separator 13 interposed therebetween. For example, the first electrode plate 11 may include a positive electrode plate and the second electrode plate 12 may include a negative electrode plate. The separator 13 may be an insulator preventing the first and second electrode plates 11 and 12 from coming in direct contact with each other. For example, the separator 13 may include a porous polymer film to be a path of ions.

The first electrode plate 11 may be formed by coating a positive electrode active material on a positive electrode collector made of, for example, aluminum or the like, which is a thin-film metal. In this case, the first electrode plate 11 may include a first non-coating portion 11a that is a portion at which the positive electrode active material is not coated on the positive electrode collector so that the positive electrode collector is exposed as it is. The positive electrode active material may be made of a lithium-based oxide.

The second electrode plate 12 may be formed by coating a negative electrode active material on a negative electrode collector made of, for example, copper or the like, which is a thin-film metal. The negative electrode active material may use a material containing carbon as a main element. The second electrode plate 12 may include a second non-coating portion 12a that is a portion at which the negative electrode active material is not coated on the negative electrode collector.

The electrode assembly 10 includes first and second electrode tabs 14 and 15 respectively connected to the first and second electrode plates 11 and 12, and the first and second electrode tabs 14 and 15 may be extracted in parallel from the electrode assembly 10 while being spaced apart from each other. The first and second electrode tabs 14 and 15 may be made of a conductive metal, and may be coupled to the positive and negative electrode non-coating portions 11a and 12a of the first and second electrode plates 11 and 12, respectively.

The battery case 16 may include a lower case 16a having an opened surface and a cap assembly 16b with which the lower case 16a is sealed. The secondary battery 100 may be manufactured by accommodating the electrode assembly 10 and an electrolyte in the lower case 16a and then sealing the lower case 16a with the cap assembly 16b. Positive and negative electrode terminals 17 and 18 having different polarities and a vent portion 19 may be formed on the cap assembly 16b.

The positive electrode terminal 17 may be connected to the first electrode tab 14, and the negative electrode terminal 18 may be connected to the second electrode tab 15. Electrons (or electric current) generated from the first and second electrode plates 11 and 12 are transferred to the positive and negative electrode terminals 17 and 18 through the first and second electrode tabs 14 and 15, respectively. The vent portion 19 is a safety means of the secondary battery 100 and acts as a path along which gas generated in the interior of the secondary battery 100 is exhausted to the exterior of the secondary battery 100.

The secondary battery 100 may include a gas collecting member 110. The gas collecting member 110 collects gas that becomes a cause of an increase in the internal pressure of the secondary battery 100. The gas collecting member may be composed of a first collecting member 111 collecting the gas and a second collecting member 112 provided to surround the first collecting member 111. The gas collecting member 110 may be provided between the first and second electrode tabs 14 and 15.

Since the first and second electrode tabs 14 and 15 have different polarities from each other, the first and second electrode tabs 14 and 15 are spaced apart from each other so as to prevent a short circuit therebetween. Therefore, an empty space may be provided between the first and second electrode tabs 14 and 15. Since the gas collecting member 110 is provided in the empty space between the first and second electrode tabs 14 and 15, the gas collecting member 110 may be provided in the space without need of an additional separate space for the gas collecting member 110. Thus, in the secondary battery 100 according to this embodiment, an additional increase in the volume of the secondary battery 100 does not occur due to the gas collecting member 110, and the internal space inside of the battery may be efficiently utilized.

In a general secondary battery, the charging/discharging of the secondary battery is performed by the flow of electrons (or current) generated by an electrochemical reaction of positive and negative electrode and an electrolyte. Therefore, when the charging/discharging of the secondary battery is performed, the electrochemical reaction repetitively occurs in the secondary battery. The electrolyte may include, for example, an organic solvent. The organic solvent may provide a high electromotive force in the movement of electrons (or ions) and thus is widely used. On the other hand, a side reaction may occur according to the electrochemical reaction, and the organic solvent used as the electrolyte is decomposed by the side reaction so as to generate gas. The gas is generated when the secondary battery is kept or used at a high temperature for a long period of time or when the side reaction is accelerated by overcharge of the battery or the like. The gas generated as described above becomes a cause of an increase in the internal pressure of the secondary battery. Therefore, the charging/discharging of the secondary battery is impossible by operating a circuit interrupt device (CID) that is a safety member provided in the interior of the secondary battery, and the outer shape of the secondary battery is deformed because of swelling of the secondary battery. Further, the gas may be penetrated into a gap of an electrode assembly, and therefore, the shape of the electrode assembly may be deformed. Furthermore, the gas increases the distance between the positive and negative electrode plates, and therefore, the secondary battery may be deteriorated.

An aspect of the present invention relates to a secondary battery capable of solving such problems by controlling the gas generated in the interior of the secondary battery. A new gas collecting member is provided in the interior of the secondary battery, so that it is possible to prevent an increase in the internal pressure of the secondary battery. Thus, it is possible to prevent the deterioration of the secondary battery, thereby increasing the lifetime of the secondary battery and improving the reliability of the secondary battery.

Figure 3A:
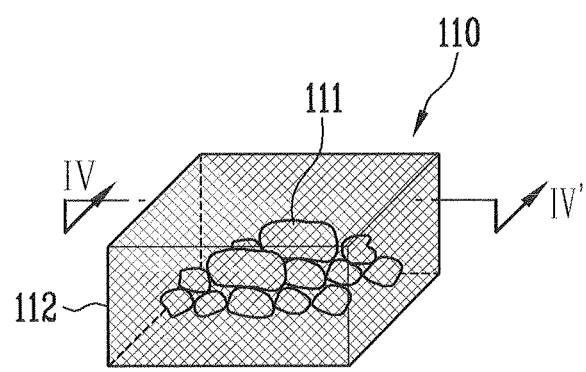
FIG. 3A is a schematically oblique view of a gas collecting member shown in FIG. 2.
Figure 3B:
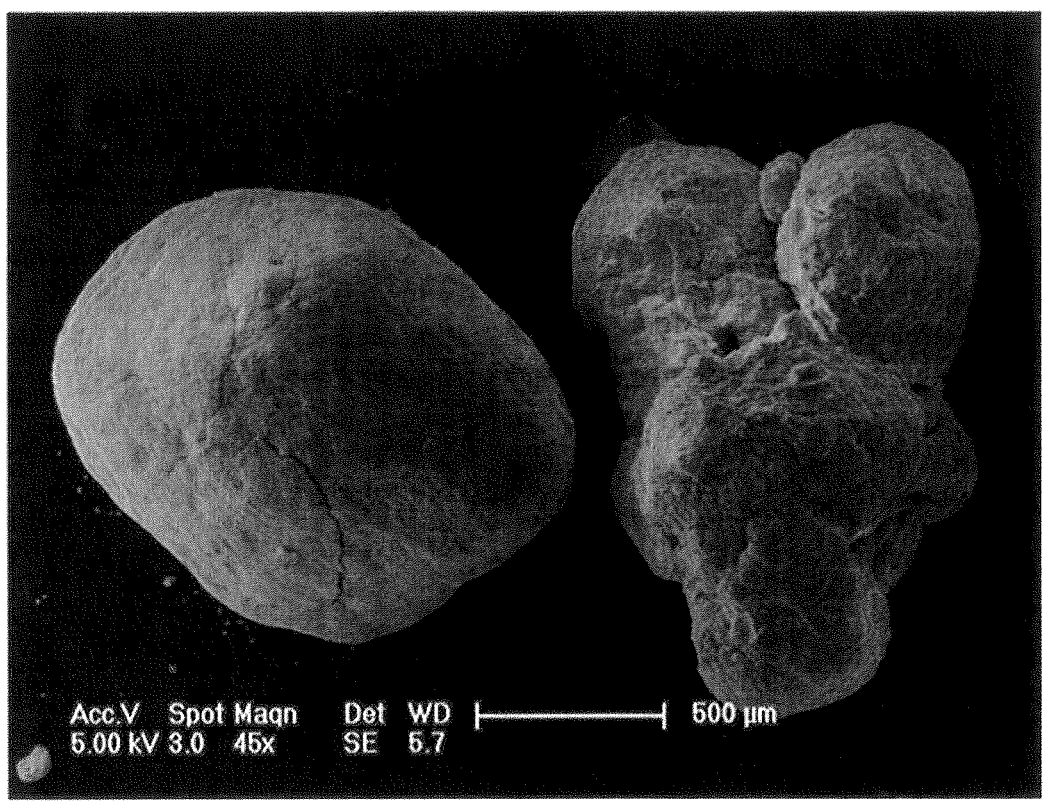
FIG. 3B is a scanning electron microscope (SEM) photograph showing a non-crystalline inorganic oxide.

FIG. 3A is a perspective view of a gas collecting member shown in FIG. 2. FIG. 3B is a scanning electron microscope (SEM) photograph showing a non-crystalline inorganic oxide.

In reference to FIGS. 3A and 3B, the gas collecting member 110 may be composed of the first and second collecting members 111 and 112. The first collecting member 111 is the part that absorbs and collects gas, and the gas flowed in the gas collecting member 110 by passing through the second collecting member 112 may be absorbed by the first collecting member 111 so as to be fixed by the first collecting member 111. For example, the first collecting member 111 may include at least one of a porous metal oxide, a porous carbon material and a non-crystalline inorganic oxide.

The porous metal oxide includes at least one of zeolite, silica gel, alumina and molecular sieves. The porous carbon material includes at least one of carbon molecular sieves and active carbon. The non-crystalline inorganic oxide includes $Al_2O_3$—$SiO_2$—$TiO_2$. FIG. 3B is an SEM photograph showing the $Al_2O_3$—$SiO_2$—$TiO_2$ used as the first collecting member 111.

Figure 4:
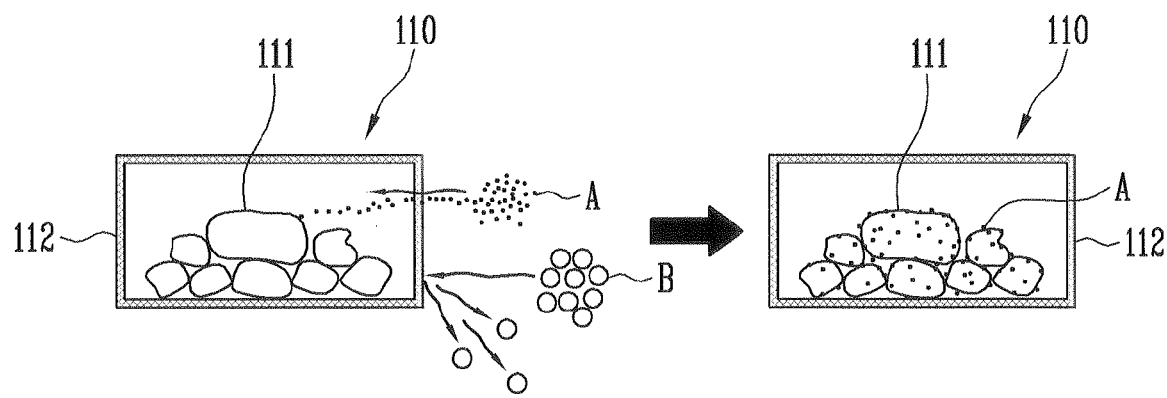
FIG. 4 is a sectional view taken along line IV-IV' of the gas collecting member shown in FIG. 3A.

FIG. 4 is a sectional view taken along line IV-IV' of the gas collecting member shown in FIG. 3A.

Referring to FIG. 4, the gas collecting member 110 is composed of the first and second collecting members 111 and 112, and the second collecting member 112 may include a membrane through which only gas-phase material can pass. For example, the second collecting member 112 may include a Teflon membrane or hydrophobic polymer membrane.

The gas collecting member 110 is provided together with the electrolyte in the interior of the secondary battery. In this case, the second collecting member 112 is provided to surround the first collecting member 111. The second collecting member 112 is made of a membrane through which only a gas-phase material A, for example, gas generated in the interior of the secondary battery, can pass. Therefore, the electrolyte B that is in a liquid or polymer gel state cannot pass through the second collecting member 112. That is, the gas collecting member 110 collects only gas A generated in the interior of the secondary battery, and the gas collecting member 110 does not conduct any interaction with the electrolyte B. As described above, the gas flowed in the gas collecting member 110 by passing through the second collecting member 112 is absorbed and caught by the first collecting member 111 so as not to be again exhausted to the exterior. Thus, it is possible to suppress an increase in the internal pressure of the secondary battery and to prevent the deterioration of the secondary battery.

Hereinafter, another exemplary embodiment of the present invention will be described with reference to FIGS. 5 and 6. Contents described in this embodiment, except the following contents, are similar to those described in the embodiment shown in FIGS. 1 to 4, and therefore, their detailed descriptions will be omitted.

Figure 5:
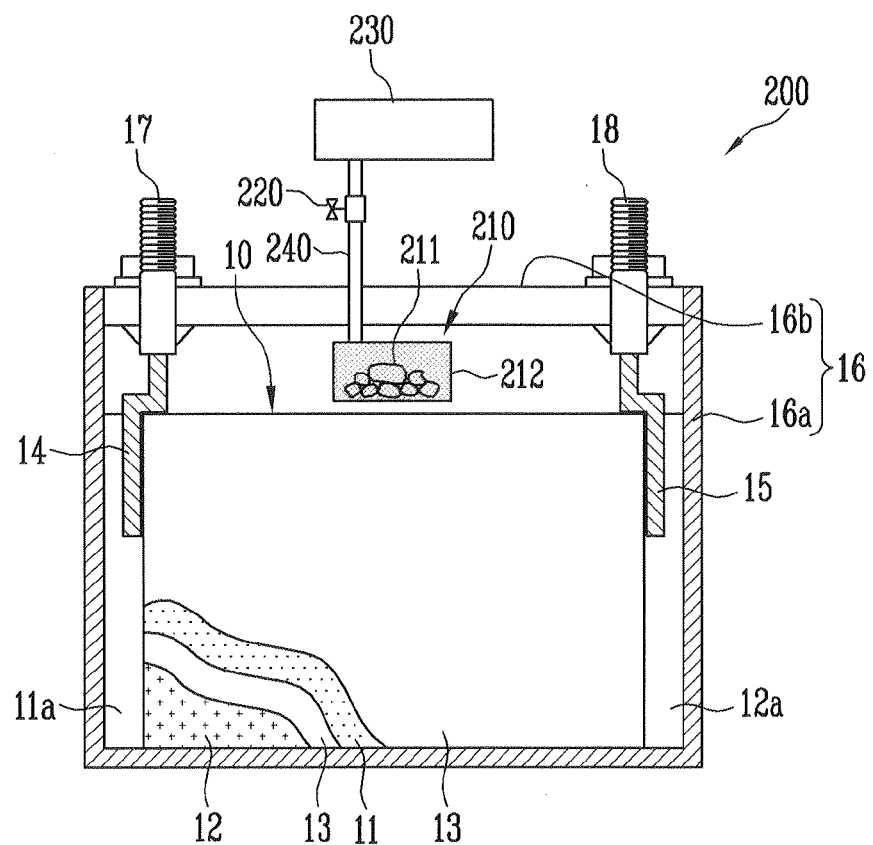
FIG. 5 is a sectional view of a secondary battery constructed with another embodiment of the present invention.

FIG. 5 is a sectional view of a secondary battery constructed with another embodiment of the present invention. FIG. 6 is a perspective view showing a gas collecting member and a space portion, shown in FIG. 5.

Figure 6:
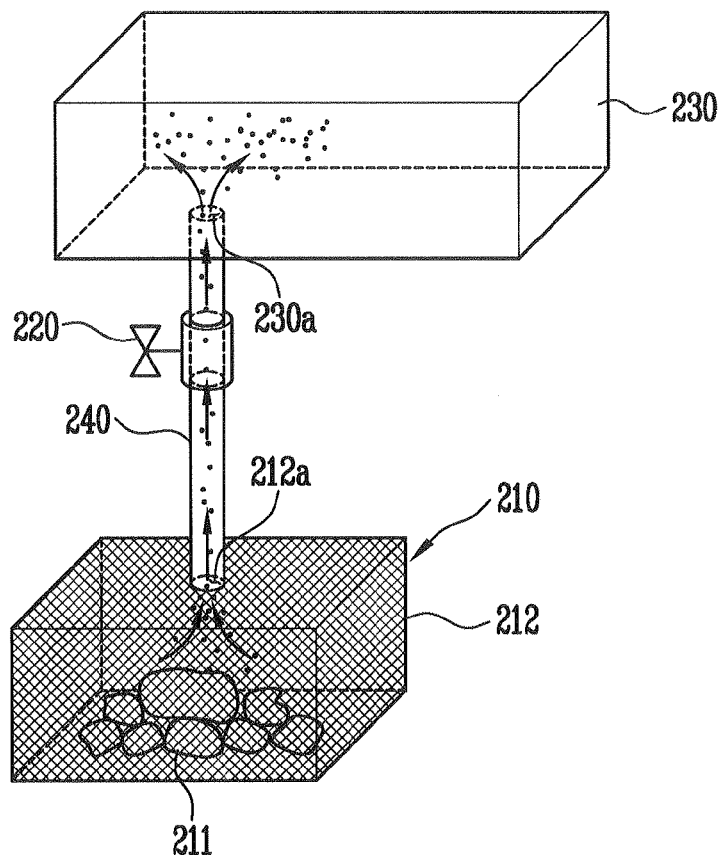
FIG. 6 is an oblique view showing a gas collecting member and a space portion of FIG. 5.

Referring to FIGS. 5 and 6, in the secondary battery 200 constructed with this embodiment, an electrode assembly 10 and a gas collecting member 210 are accommodated in a battery case 16, and the gas collecting member 210 may be provided between first and second electrode tabs 14 and 15 having different polarities, which are extracted from the electrode assembly 10.

The secondary battery 200 may further include a valve 220 provided adjacent to the gas collecting member 210 at the exterior of the secondary battery. For example, the valve 220 is operated by the internal pressure of the secondary battery 200, and may include an anti-countercurrent valve that enables only the exhaustion of gas to the exterior and prevents the inflow of gas from the exterior. The secondary battery 200 further includes a space portion 230, and the space portion 230 may be provided to be connected to the valve 220 at the exterior of the secondary battery 200. The valve 220 may be operated by the internal pressure of the secondary battery 200. When the external pressure is relatively higher than the internal pressure of the secondary battery 200, the valve 220 is operated so that external gas is not flowed in the interior of the secondary battery 200, and the exhausted gas is not again flowed back into the interior of the secondary battery 200.

The space portion 230 may be further provided at the exterior of the secondary battery 200, and an inlet 230a may be provided to the space portion 230. An outlet 212a may be provided to the second collecting member 212 of the gas collecting member 210 provided in the interior of the secondary battery 200. The inlet 230a of the space portion 230 and the outlet 212a of the gas collecting member 210 communicate with each other through a transfer pipe 240, and the valve 220 is provided to the transfer pipe 240 so as to control the movement of the gas.

That is, when the internal pressure of the gas collecting member 210 reaches a predetermined value due to an increase in the flow rate of gas collected in the gas collecting member 210, the valve 220 is opened, and the gas is transferred to the space portion 230 along the transfer pipe 240. The gas is transferred by a difference in pressure between the gas collecting member 210 and the space portion 230. That is, the relative pressure difference allows the gas to be transferred, and the internal pressure of the gas collecting member 210 is decreased, so that the gas collecting member 210 can more easily collect the gas generated in the inside of the secondary battery 200. Subsequently, the valve 220 is again closed, and the gas transferred to the space portion 230 is exhausted to the exterior.

Hereinafter, embodiments of the present invention and comparative examples will be described. However, the following embodiments are merely embodiments of the present invention, and the scope of the present invention is not limited to the following embodiments.

Secondary batteries constructed with embodiments and comparative examples were manufactured using the same electrode assembly and electrolyte. The secondary batteries constructed with the embodiments used with different kinds of first collecting members are shown in the following Table 1, respectively. A second collecting member formed using the same material was provided to each of the secondary batteries according to the embodiments. A Teflon membrane having the same specification was used as the second collecting member. Like the aforementioned embodiment, a valve and a space portion were provided at the exterior of the secondary battery. In the embodiments, the valve and the space portion were connected to the gas collecting member through the transfer pipe. In the comparative examples, however, the gas collecting member was not provided in the interior of the secondary battery, and hence the transfer pipe was inserted into the secondary battery. The secondary battery provided with the transfer pipe blocked a gas exchange with the exterior through sealing.

The lifetime cycle (one-time lifetime cycle refers to a lifetime cycle obtained by charging the secondary battery once and then discharging the secondary battery) of each of the secondary batteries according to the embodiments and the comparative examples was identified by repeatedly performing charging and discharging of the secondary battery in the same manner, and the thickness of each of the secondary batteries was measured. Such a result was shown in Table 1.

TABLE 1

| Kind of first collecting member | | Lifetime cycle (times) & presence of completion of charging/ discharging | Increment in thickness of secondary battery |
|---|---|---|---|
| No gas collecting member | Comparative example 1 | 80,000 & completion | 8.0 mm |
| | Comparative example 2 | 73,000 & completion | 7.5 mm |
| | Comparative example 3 | 69,000 & completion | 8.2 mm |
| | Comparative example 4 | 75,000 & completion | 7.9 mm |
| Average of comparative examples | | 74,250 | 7.9 mm |
| Zeolite | Embodiment 1 | 150,000 & in progress | 2 mm |
| | Embodiment 2 | 150,000 & in progress | 1.8 mm |
| | Embodiment 3 | 150,000 & in progress | 2.1 mm |
| | Embodiment 4 | 150,000 & in progress | 1.9 mm |
| Average of embodiments of zeolite | | 150,000 | 1.95 mm |
| Non-crystalline inorganic oxide ($Al_2O_3$—$SiO_2$—$TiO_2$) | Embodiment 5 | 150,000 & in progress | 1.5 mm |
| | Embodiment 6 | 150,000 & in progress | 1.8 mm |
| | Embodiment 7 | 150,000 & in progress | 2.0 mm |
| | Embodiment 8 | 150,000 & in progress | 2.1 mm |
| Average of embodiments of non-crystalline inorganic oxide | | 150,000 | 1.85 mm |

In the comparative examples 1 to 4, the gas collecting member was not provided in the interior of the secondary battery, but the valve and the space portion were provided at the exterior of the secondary battery. An anti-countercurrent valve was used as the valve so that external gas was not flowed in the secondary battery and only internal gas could be exhausted to the outside of the secondary battery. When only the anti-countercurrent valve and the space portion are provided to the secondary battery, it can be seen that the exhaustion of the gas generated in the interior of the secondary battery is ineffective. That is, it can be seen that the gas collecting member is necessarily provided to the secondary battery so as to decrease the internal pressure of the secondary battery.

In the comparison as shown in Table 1, the lifetime cycles were all finished in average 74250 times of charging/discharging in the comparative examples 1 to 4. This means that, in the comparative examples 1 to 4, after an average 74250 times of charging/discharging, the charging/discharging of all the secondary batteries cannot be performed any more due to the deterioration of all the secondary batteries; therefore, the lifetime cycles of all the secondary batteries are finished.

On the other hand, in the embodiments 1 to 8, it can be seen that the lifetime cycles of all the secondary batteries (the zeolite is used as the first collecting member in the embodiments 1 to 4, and the non-crystalline inorganic oxide is used as the first collecting member in the embodiments 5 to 8) can be all performed average 150,000 times or more.

In the embodiments and the comparative examples, the increment in the thickness of each of the secondary batteries was identified by measuring the thickness before the lifetime cycle was performed and the thickness after the lifetime cycle was performed. In the comparative examples 1 to 4, the increment in the thickness of each of the secondary batteries was measured at the time when the lifetime cycle of each of the secondary batteries was finished. In the embodiments 1 to 8, the increment in the thickness of each of the secondary batteries was measured when the lifetime cycle of each of the secondary batteries was performed 150,000 times. It can be seen that although the thickness of each of the secondary batteries in the embodiments 1 to 8 is measured after the lifetime cycle of each of the secondary batteries in the embodiments 1 to 8 is performed twice greater than that in the comparative examples 1 to 4, the increment in the thickness of each of the secondary batteries in the embodiment 1 to 8 is superior to that in the comparative examples 1 to 4. That is, it can be seen that while the average increment in the thickness of each of the secondary batteries in the comparative examples 1 to 4 is 7.9 mm when the average lifetime cycle of each of the secondary batteries in the comparative examples 1 to 4 is performed 74,250 times, the average increment in the thickness of each of the secondary batteries is 1.95 mm in the embodiments 1 to 4 and 1.85 mm in the embodiments 5 to 8 when the lifetime cycle of each of the secondary batteries in the embodiments 1 to 8 is performed 150,000 times.

It can be seen that the lifetime performance in the comparative examples 1 to 4 having no gas collecting member is inferior to that in the embodiments 1 to 8 having the gas collecting member. In the increment in the thickness of each of the secondary batteries, it can be seen that although the final thickness of each of the secondary batteries in the embodiments 1 to 8 is measured after the lifetime cycle of each of the secondary batteries in the embodiments 1 to 8 is performed twice greater than that in the comparative examples 1 to 4, the increment in the thickness of each of the secondary batteries in the embodiments 1 to 8 is much smaller than that in the comparative examples 1 to 4. In the comparative examples, the outer shape of each of the secondary batteries was changed according to the increase in the thickness; in a serious case, the leakage of the electrolyte occurred in the vent portion of each of the secondary batteries.

Figure 7:
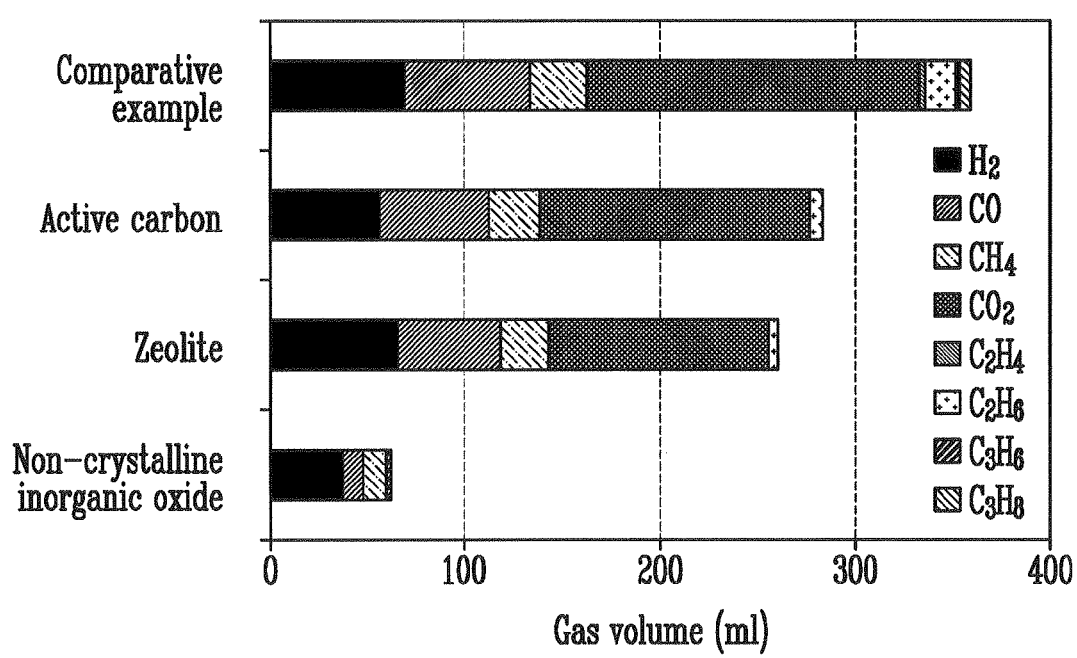
FIG. 7 is a graph comparing flow rates of gas generated in the interiors of different secondary batteries.

FIG. 7 is a graph comparing flow rates of gas generated in the interior of the secondary battery.

In reference to FIG. 7, the gas generated in the interior of the secondary battery mainly includes $CH_4$, $C_2H_4$, $C_2H_6$, CO, $CO_2$, $H_2$ and the like. Particularly, the $CH_4$ and $CO_2$ are mainly included in the gas. It can be seen that the flow rate of gas generated in the interior of the secondary battery having no gas collecting member in the comparative example is larger than that of gas generated in the interior of the secondary battery having the gas collecting member (for example, including active carbon, zeolite, or non-crystalline inorganic oxide). That is, the gas generated in the interior of the secondary battery having the gas collecting member is collected and absorbed by the first collecting member of the gas collecting member, and thus it can be seen that a relatively smaller amount of gas exists in the interior of the secondary battery.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
    an electrode assembly having first and second electrode plates and a separator interposed between the first and second electrode plates;
    a gas collecting member provided adjacent to the electrode assembly; and
    a battery case accommodating the electrode assembly and the gas collecting member,
    with the gas collecting member comprising a first collecting member collecting gas generated in an interior of the battery case and a second collecting member provided to surround the first collecting member,
    wherein the first collecting member comprises $Al_2O_3$—$SiO_2$—$TiO_2$.

2. The secondary battery according to claim 1, wherein the electrode assembly comprises first and second electrode tabs respectively connected to the first and second electrode plates, and the first and second electrode tabs are extracted in parallel from the electrode assembly while being spaced apart from each other.

3. The secondary battery according to claim 2, wherein the gas collecting member is provided between the first and second electrode tabs.

4. The secondary battery according to claim 1, wherein the second collecting member comprises a membrane through which only a gas-phase material passes.

5. The secondary battery according to claim 4, wherein the second collecting member comprises a Teflon membrane or hydrophobic polymer membrane.

6. The secondary battery according to claim 1, further comprising a valve provided adjacent to the gas collecting member at an exterior of the secondary battery.

7. The secondary battery according to claim 6, wherein the valve is operated by an internal pressure of the secondary battery, and comprises an anti-countercurrent valve that enables only an exhaustion of gas to the exterior of the secondary battery and prevents an inflow of gas to the interior of the secondary battery.

8. The secondary battery according to claim 6, further comprising a sealed space portion,
    wherein the sealed space portion is provided to be connected to the valve at the exterior of the secondary battery.

* * * * *